(12) United States Patent
Luo

(10) Patent No.: US 7,808,777 B2
(45) Date of Patent: Oct. 5, 2010

(54) HARD DISK CASE

(75) Inventor: Ming-Kun Luo, Government Jiangsu (CN)

(73) Assignee: Universal Scientific Industrial Co., Ltd., Tsao Tuen (TW)

(*) Notice: Subject to any disclaimer, the term of this patent is extended or adjusted under 35 U.S.C. 154(b) by 112 days.

(21) Appl. No.: 12/331,165

(22) Filed: Dec. 9, 2008

(65) Prior Publication Data

US 2009/0168243 A1    Jul. 2, 2009

(30) Foreign Application Priority Data

Dec. 28, 2007    (TW) .............................. 96222450 U

(51) Int. Cl.
*G06F 1/16*    (2006.01)

(52) U.S. Cl. .............................. 361/679.37; 248/316.1; 312/223.2; 348/836; 360/265.6

(58) Field of Classification Search .............. 248/316.1, 248/634; 361/679.31, 679.32, 679.33, 679.35, 361/679.37, 679.58; 312/223.2; 428/220, 428/313; 360/133, 99.12, 99.08, 265.6, 97.01; 711/114, 112, 147, 161; 348/169, 143, 836, 348/148

See application file for complete search history.

(56) References Cited

U.S. PATENT DOCUMENTS

| 5,668,696 | A | * | 9/1997 | Schmitt | 361/679.31 |
| 6,015,196 | A | * | 1/2000 | Welch et al. | 312/223.2 |
| 6,549,402 | B2 | * | 4/2003 | Chin | 361/679.33 |
| 2008/0180901 | A1 | * | 7/2008 | Yang | 361/685 |
| 2009/0294618 | A1 | * | 12/2009 | Huang | 248/316.1 |

* cited by examiner

*Primary Examiner*—Hung V Duong
(74) *Attorney, Agent, or Firm*—Browdy and Neimark, PLLC

(57) ABSTRACT

A hard disk case for installation in a computer case includes a support frame for installation of a hard disk drive, a base mounted to the support frame, and a handle. The handle has a pivoting end pivotally connected with the base, a first protrusion insertable in an insertion portion of the computer case and pushable against a periphery wall of the insertion portion for enabling engagement of the hard disk drive with the computer case, and a second protrusion spaced from the first protrusion and pushable against a stopping portion of the computer case for enabling disengagement of the hard disk drive from the computer case. As a result, the hard disk case of the present invention is convenient in assembly and disassembly works.

7 Claims, 8 Drawing Sheets

HARD DISK CASE

BACKGROUND OF THE INVENTION

1. Field of the Invention

The present invention relates generally to a hard disk case for holding a hard disk drive, and more specifically to a drawable hard disk case that can be expeditiously and smoothly assembled with or disassembled from a computer case.

2. Description of the Related Art

A conventional removable hard disk drive is screwed to a hard disk case that is detachably mounted in a computer case and electrically connected to a connector of the computer case, such that the hard disk drive and the hard disk case have to be taken out of the computer case together if the hard disk drive needs to be removed out of the computer case for replacement or repair.

When assembling the hard disk case with the computer case, a user usually presses and pushes the hard disk case directly to make a hard disk drive installed in the hard disk case electrically and mechanically connect to a connector of the computer case. However, in this way, the connecting pins of the connector may be easily damaged due to the excessive force acting on the hard disk case. On the other hand, when disassembling the hard disk case from the computer case, the user needs to directly pull the hard disk case outwardly to make the hard disk drive disconnect from the connector. If the hard disk drive and the connector are connected tightly, the work for disassembling the hard disk drive from the connector will be laborious. It can be seen that the conventional hard disk case has drawbacks in its assembly and disassembly works.

SUMMARY OF THE INVENTION

The present invention has been accomplished in view of the above-noted circumstances. It is one objective of the present invention to provide a hard disk case, which can be expeditiously and smoothly assembled with and disassembled from a computer case.

To achieve this objective of the present invention, the hard disk case comprises a support frame, a base mounted to the support frame, and a handle. The handle has a pivoting end pivotally connected with the base, a first protrusion insertable in an insertion portion of a computer case and pushable against a periphery wall of the insertion portion for enabling engagement of a hard disk drive installed in the support frame with the computer case, and a second protrusion spaced from the first protrusion and pushable against a stopping portion of the computer case for enabling disengagement of the hard disk drive from the computer case.

By means of the design of the first and second protrusions, when the handle is pivoted relative to the base, the hard disk case of the present invention can be expeditiously and smoothly assembled with or disassembled from the computer case. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
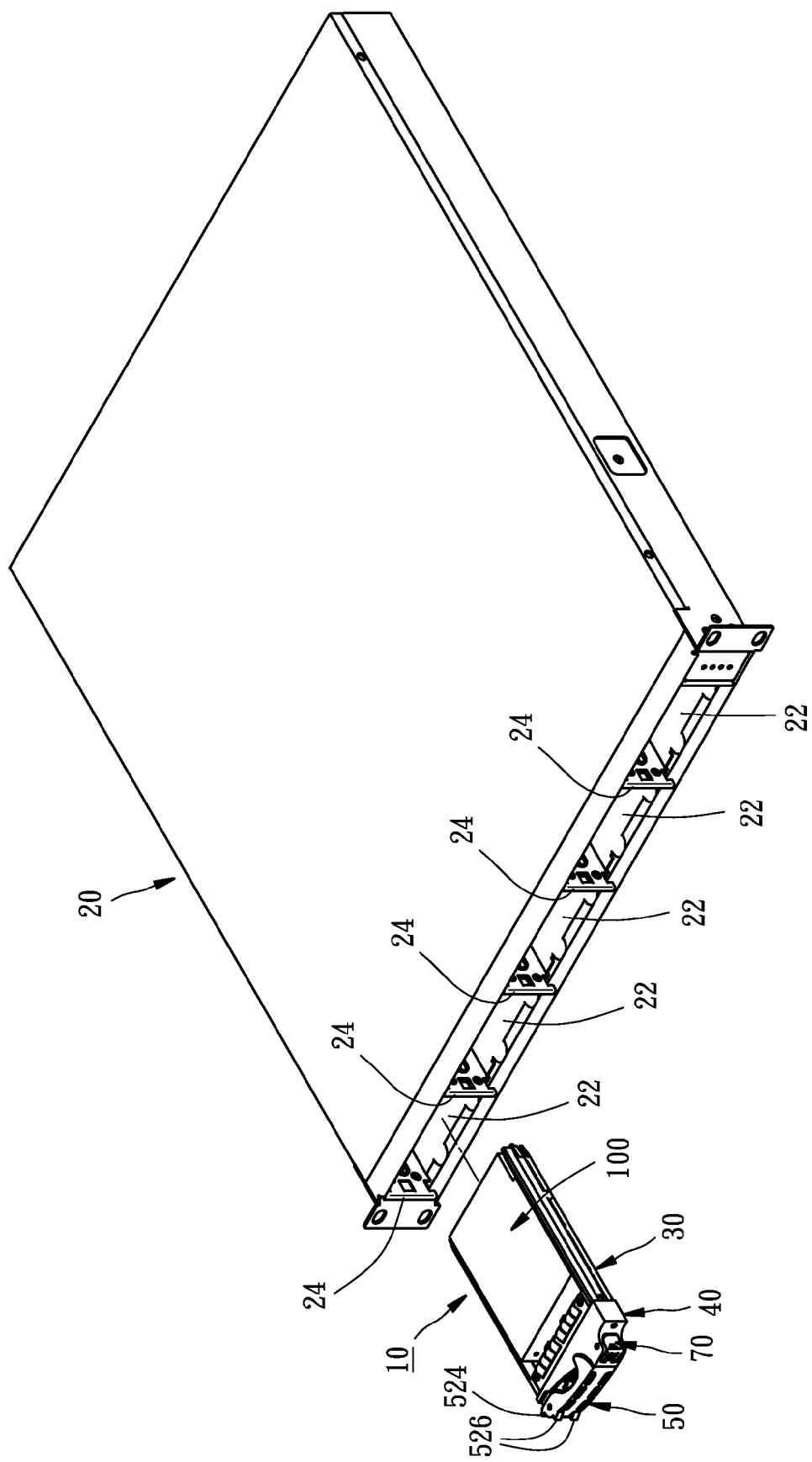
FIG. 1 is a perspective view of a hard disk case according to a preferred embodiment of the present invention and a computer case.
Figure 7:
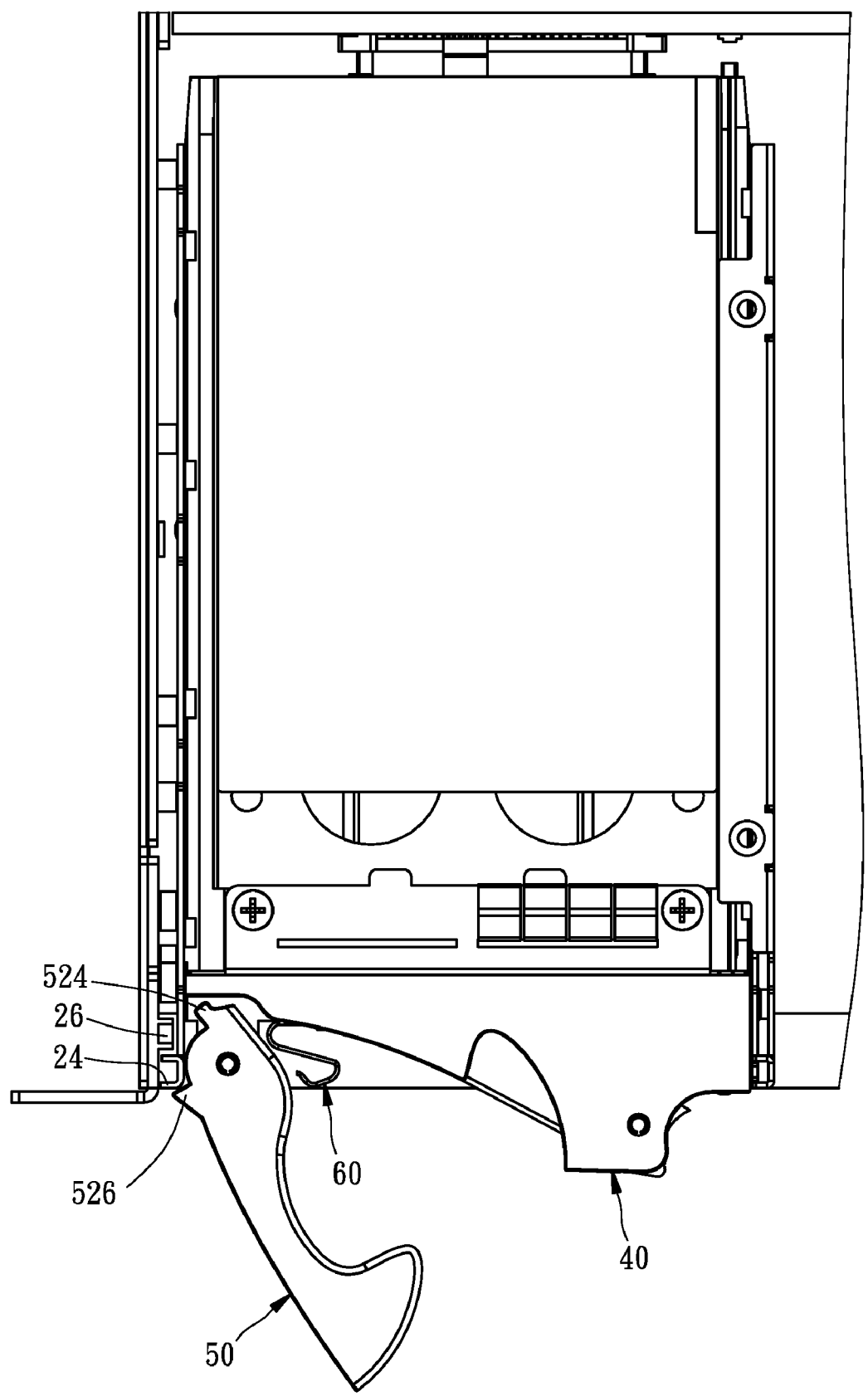
FIG. 7 is a schematic drawing of the hard disk case according to the preferred embodiment of the present invention, showing the handle is pivotable relative to the base.

As shown in FIG. 1, a hard disk case 10 in accordance with a preferred embodiment of the present invention is adapted to be installed in a computer case 20 having a plurality of receiving chambers 22 for accommodation of hard disk cases. A side wall of each receiving chamber 22 is provided at a front side thereof with a stopping portion 24 and two insertion portions 26 adjacent to the stopping portion 24, as shown in FIG. 7. The hard disk case 10 comprises a support frame 30, a base 40, a handle 50, a first elastic member 60, a button 70, a movable member 80, and a second elastic member 90, as shown in FIGS. 1-2.

The support frame 30 is provided for installation of a hard disk 100, as shown in FIG. 1.

Figure 2:
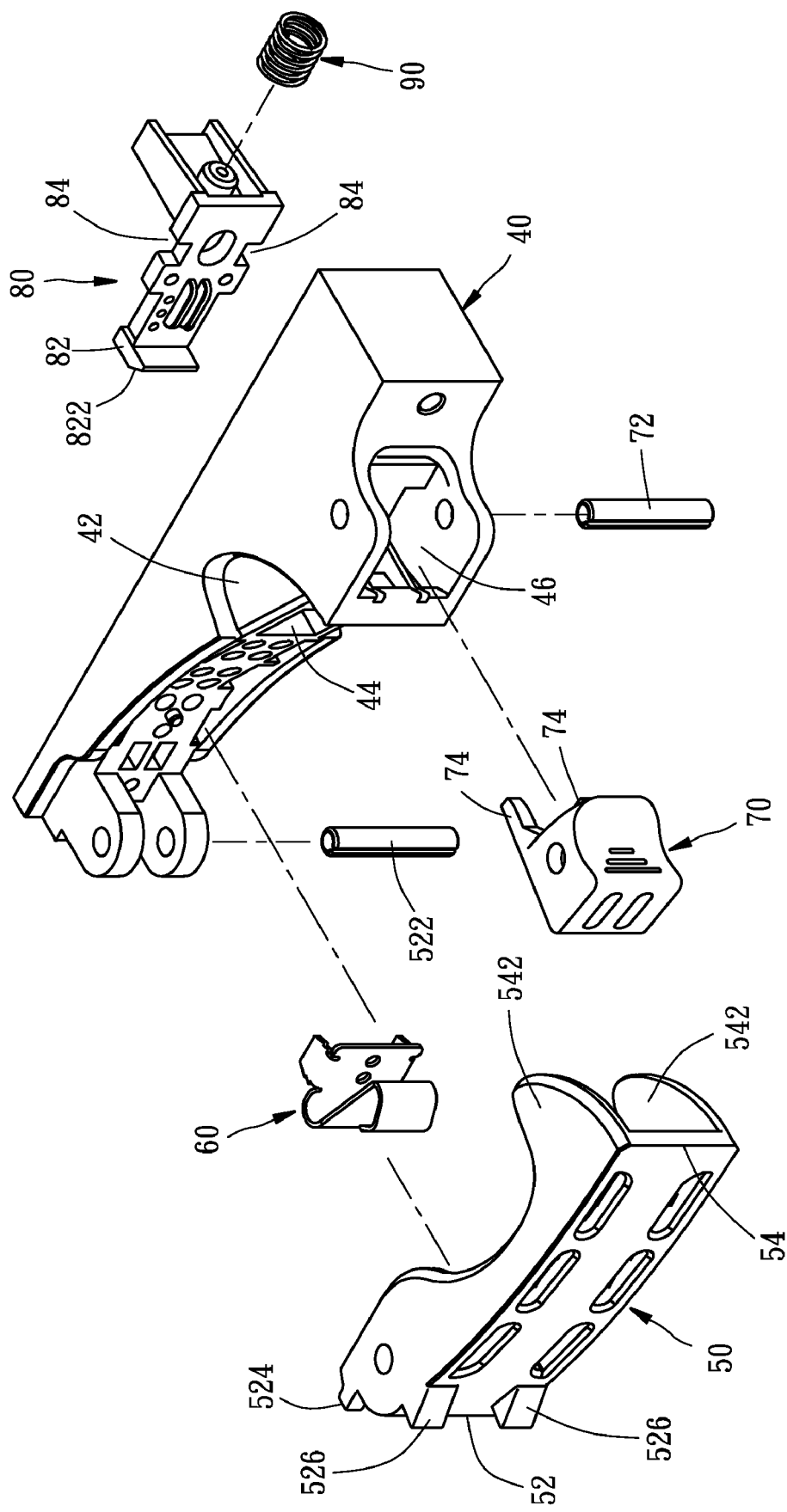
FIG. 2 is an exploded view of a part of the hard disk case according to the preferred embodiment of the present invention.

As shown in FIG. 2, the base 40 is mounted to one side of the support frame 30 and provided at each of top and bottom sides thereof with a hook slot 42. Further, the base 40 has a through hole 44 through inner and outer sides thereof between the hook slots 42 and an indentation 46 close to the through hole 44.

Figure 4:
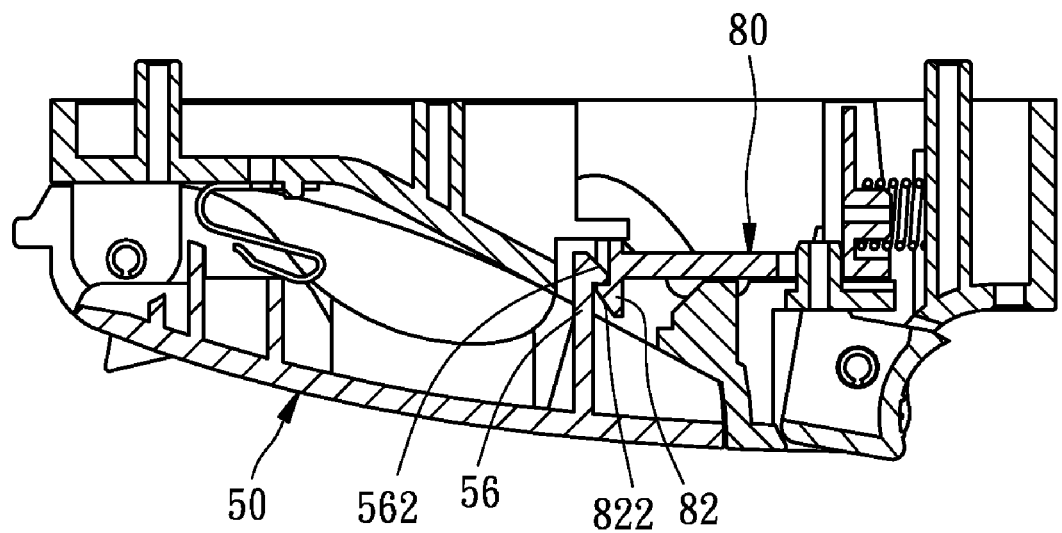
FIG. 4 is a partially cutaway view of FIG. 3, showing the movable member is located at the first position.

The handle 50 has a pivoting end 52, which is pivotally connected with the base 40 by a pin 522 and provided at each of top and bottom sides thereof with a rectangular first protrusion 524 that can be inserted into one of the insertion portions 26 of the computer case 20 and a triangular second protrusion 526 spaced at a distance from the first protrusion 524, and a connecting end 54 having two hook portions 542 that can be respectively engaged with the hook slots 42 of the base 20, and a first retaining portion 56, as shown in FIG. 4, located between the hook portions 542 and provided with a first inclined surface 562.

The first elastic member 60 is disposed in the base 40 and stopped against the handle 50 for providing an elastic force for moving the handle 50 away form the base 40.

The button 70 is pivotally connected to the base 40 by a pin 72 and located in the indentation 46 so that it can be turned relative to the base 40 by an external force. The button 70 has two extending portions 74.

Figure 3:
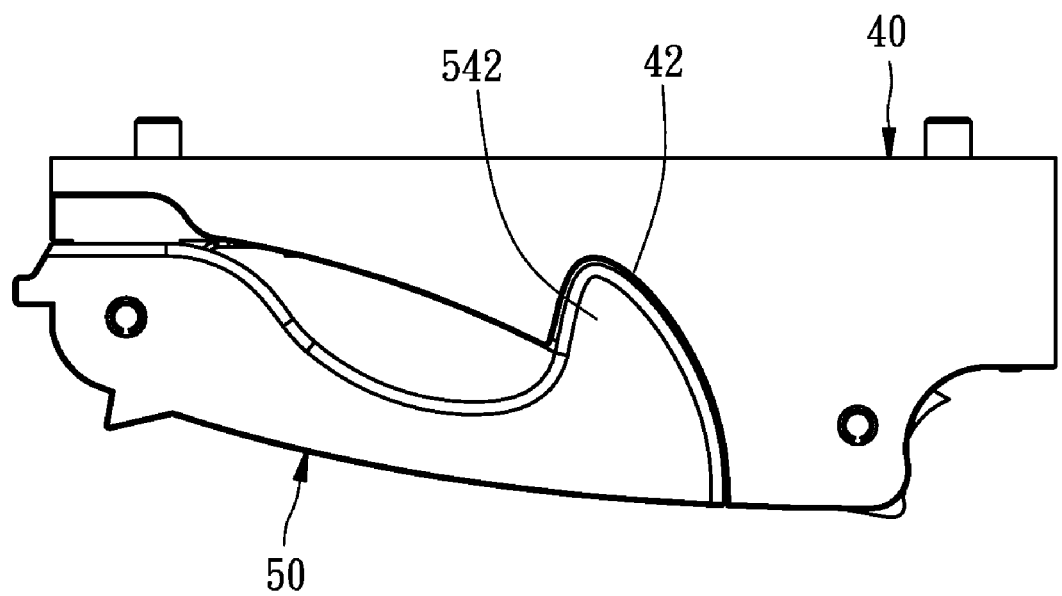
FIG. 3 is a top view of a part of the hard disk case according to the preferred embodiment of the present invention, showing the handle is engaged with the base.

The movable member 80 is mounted in the base 40 and provided at one end thereof with a second retaining portion 82, which is engageable with the first retaining portion 56 of the handle 50 and has a second inclined surface 822 with an inclined direction equal to that of the first inclined surface 562 of the handle 50 such that the first inclined surface 562 of the retaining portion 56 can be abutted against and movable along the second inclined surface 822 of the second retaining portion 82. Besides, the movable member 80 has two notches 84 for insertion of the extending portions 74 of the button 70 such that the movable member 80 can be driven by the turning actuation of the button 70 to move between a first position where the first retaining portion 56 and the hook portions 542 of the handle 50 are respectively engaged with the second retaining portion 82 of the movable member 80 and the hook slots 42 of the base 40 for stopping the handle 50 from pivotal movement relative to the base 40, as shown in FIGS. 3 and 4, and a second position where the first retaining portion 56 of the handle 50 is disengaged from the second retaining portion 82 of the movable member 80 for enabling the handle 50 to be pivotable relative to the base 40, such that the handle 50 can be forced by the first elastic member 60 to move away from the base 40, as shown in FIGS. 5 and 6.

The second elastic member 90 is disposed in the base 40 and provided with two ends respectively stopped against an inner wall of the base 40 and the movable member 80 for providing a rebound force for moving the movable member 80 from the second position to the first position when an external force exerting on the button 70 for holding the movable member 80 at the second position is released from the button 70.

Figure 5:
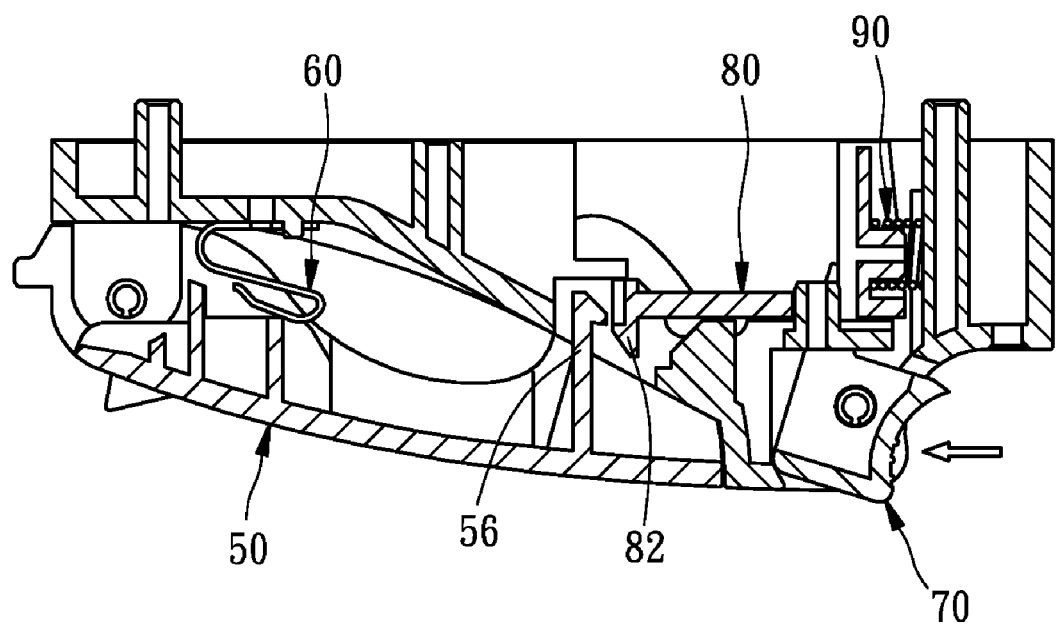
FIG. 5 is similar to FIG. 4 but showing the movable member is located at the second position.
Figure 6:
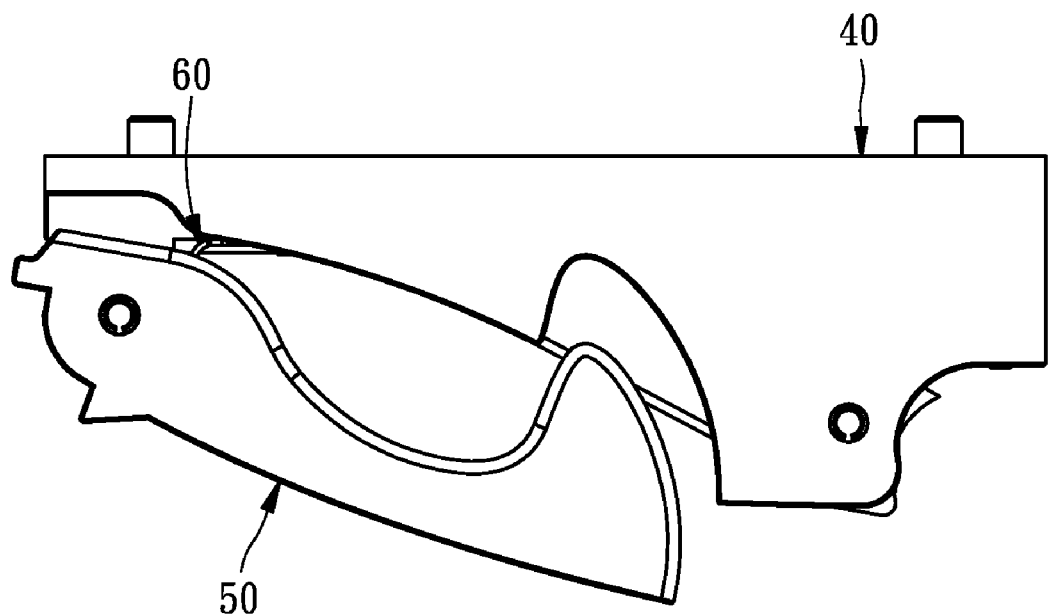
FIG. 6 is another top view of a part of the hard disk case according to the preferred embodiment of the present invention, showing the handle is pivotable relative to the base.
Figure 8:
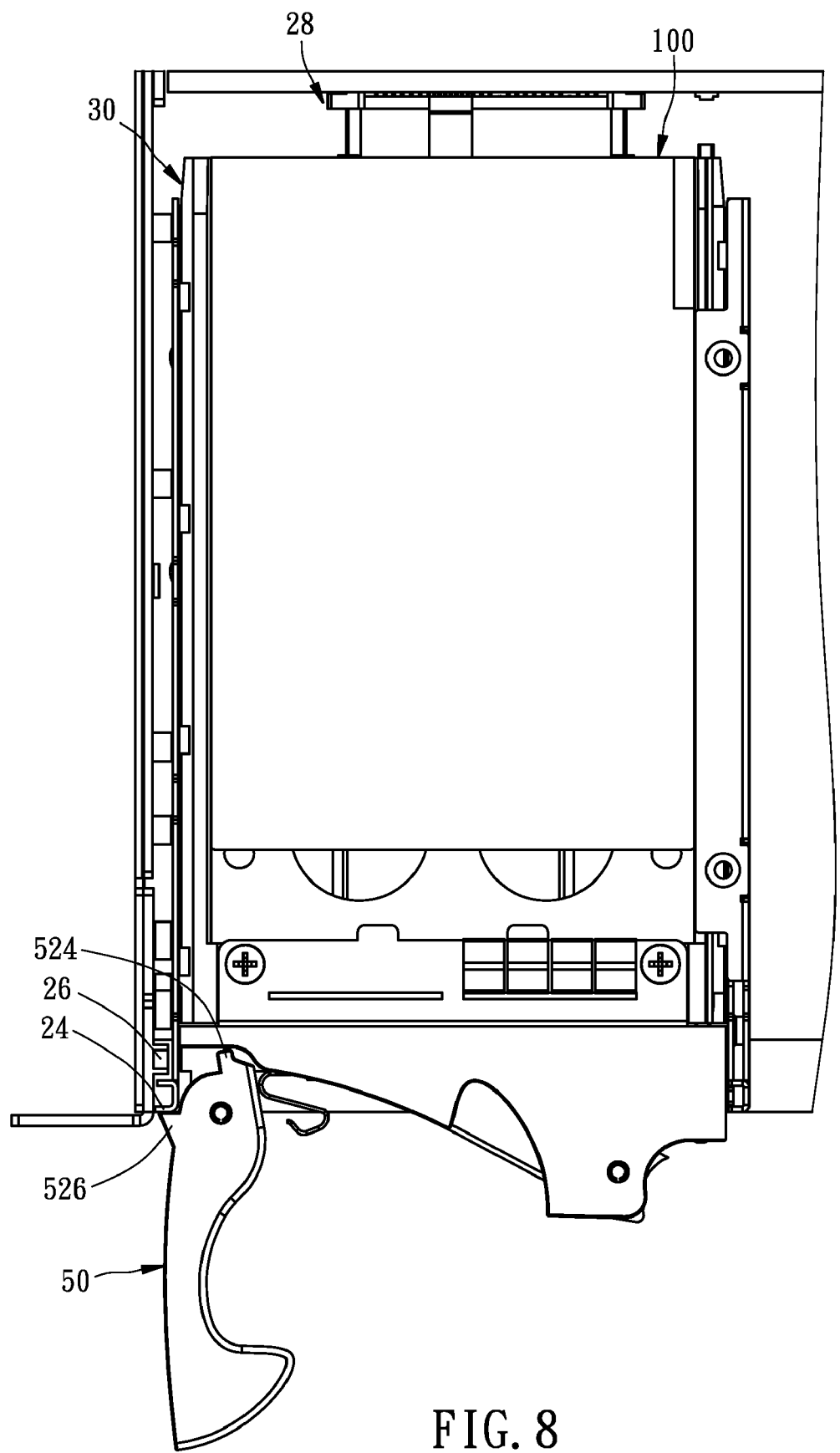
FIG. 8 is a schematic drawing of the hard disk case according to the preferred embodiment of the present invention, showing the second protrusion of the handle is stopped against the stopping portion of the computer case.

To take the hard disk case 10 out of the computer case 20, a user may press and turn the button 70 such that the movable member 80 can be moved to the second position by means of the turning actuation of the button 70 because the extending portions 74 of the button 70 are inserted into the notches 84 of the movable member 80, thereby forcing the second retaining portion 82 of the movable member 80 to be disengaged from the first retaining portion 56 of the handle 50 and causing the handle 50 to be pivotally moved away from the base 40 by means of the elastic force generated by the first elastic member 60, as shown in FIGS. 5 to 7. At this moment, releasing the force exerting on the button 70 will enable the movable member 80 to move back to the first position by means of the elastic force generated by the second elastic member 90. Thereafter, the user can subsequently pull the handle 50 outwardly to an extent that the second protrusions 526 of the handle 50 can stop and then push against the stopping portion 24 of the computer case 20, such that the second protrusions 526 can be served as a load point of a lever, i.e. the handle 50, to adversely drive the hard disk case 10 to move outwardly, as shown in FIG. 8, which in turn results in that the hard disk drive 100 installed in the support frame 30 can be separated from a connector 28 of the computer case 20, and then the hard disk case 10 can be completely pulled out of the computer case 20.

Figure 9:
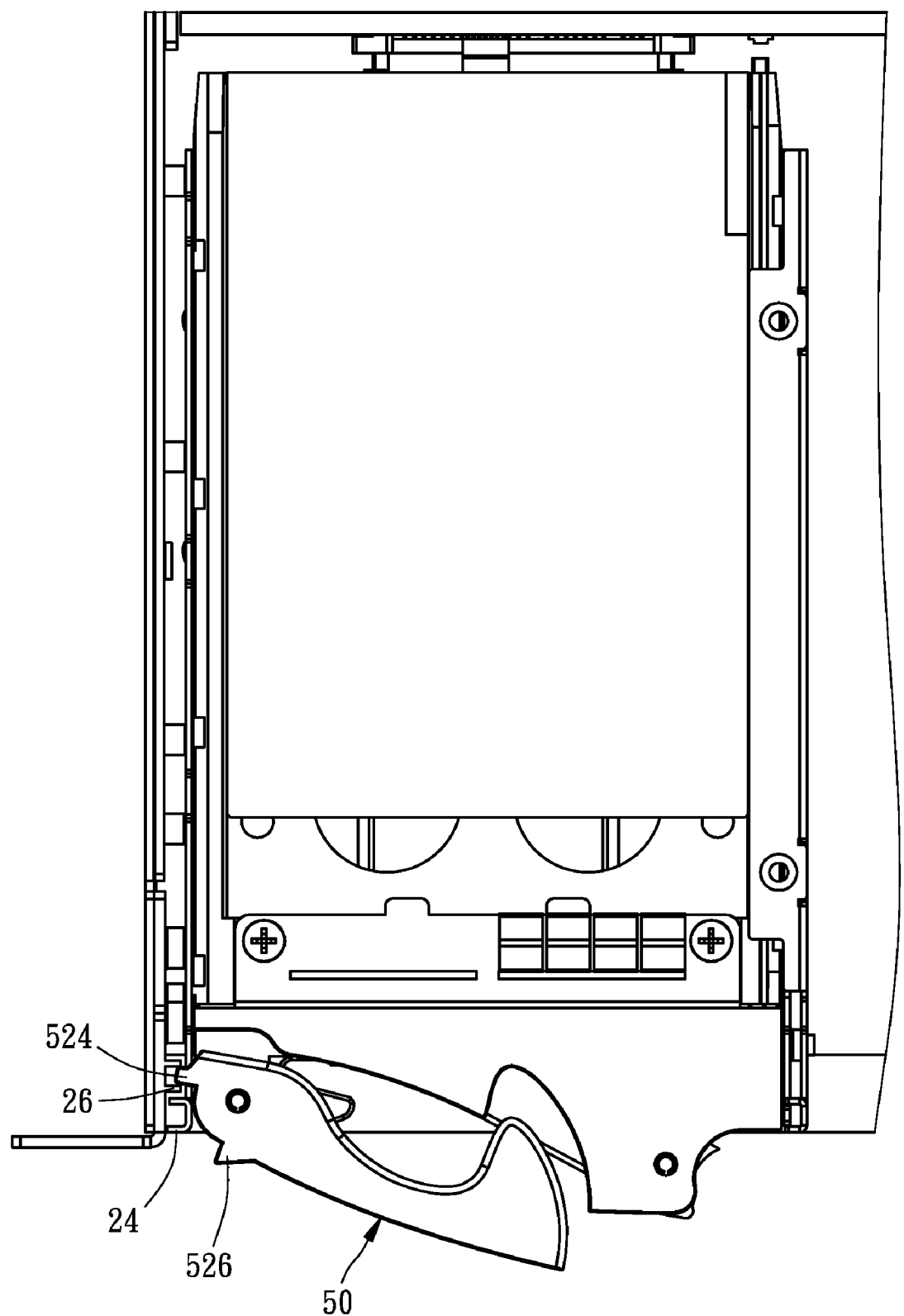
FIG. 9 is a schematic drawing of the hard disk case according to the preferred embodiment of the present invention, showing the first protrusion of the handle is stopped against the periphery wall of the insertion portion of the computer case.
Figure 10:
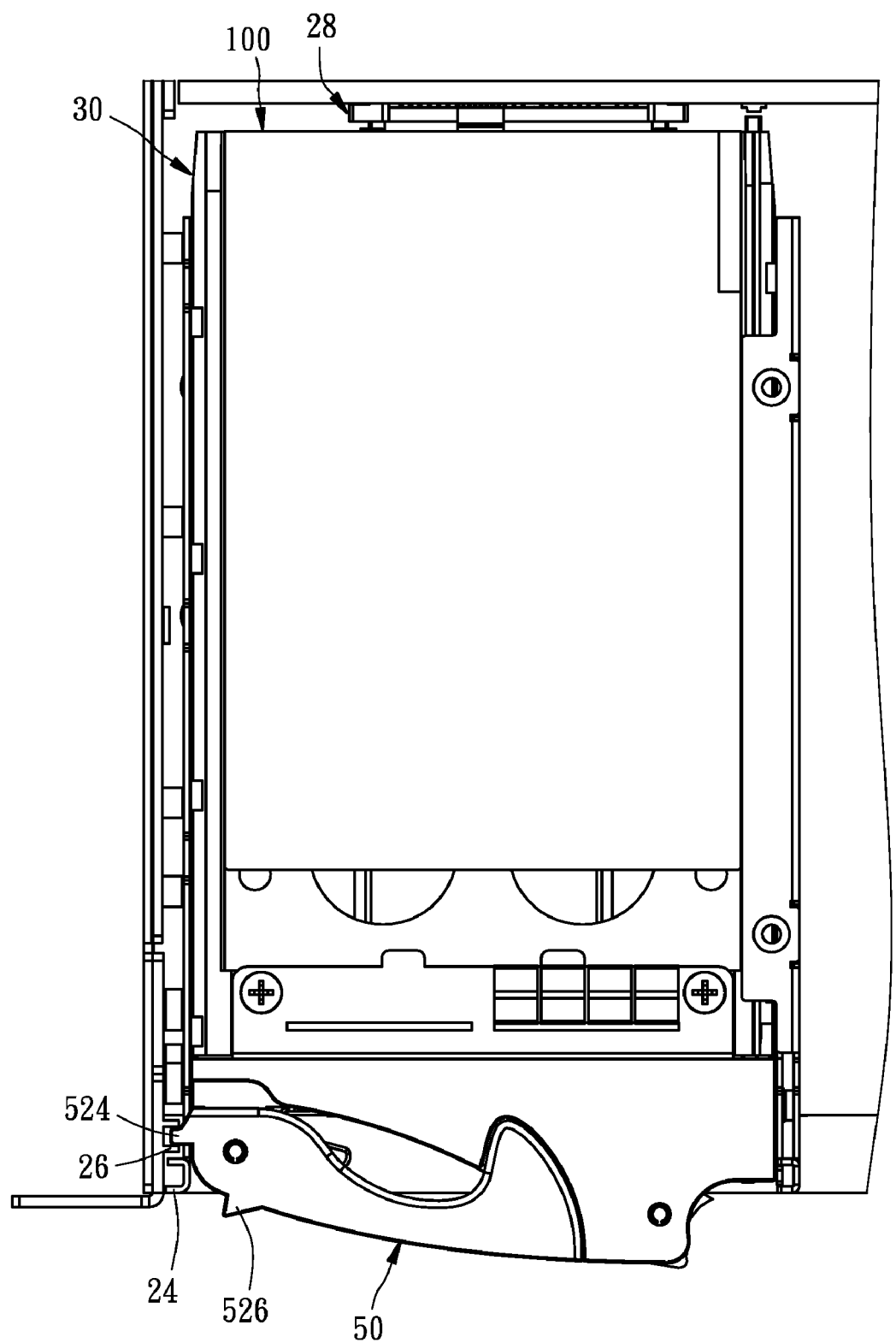
FIG. 10 is a schematic drawing of the hard disk case according to the preferred embodiment of the present invention, showing the hard disk drive is electrically and mechanically connected to the connector of the computer case.

To assemble the hard disk case 10 with the computer case 20, the user may places the hard disk case 10 in the computer case 20 in such a way that the first protrusions 524 of the handle 50 can be received in the insertion portions 26 of the computer case 20, as shown in FIG. 9. Next, the user may press the handle 50 toward the base 40 to make the first protrusions 524 of the handle 50 stop and push against periphery walls of the insertion portions 26 of the computer case 20, such that the first protrusions 524 can be served as another load point of the handle 50. And then, continuously pressing the handle 50 toward the base 40 will drive the hard disk case 10 to move inwardly to enable the hard disk drive 100 to be electrically and mechanically connected to the connector 28, as shown in FIG. 10. In the act of pressing the handle 50 toward the base 40, the first inclined surface 562 of the first retaining portion 56 of the handle 50 will abut against the second inclined surface 822 of the second retaining 82 of the movable member 80, and then move along the second inclined surface 822 and push the movable member 80 to move toward the second position, and eventually, when the handle 50 is completely contacted with base 40, i.e. when the first inclined surface 562 departs from the second inclined surface 822 and the hook portions 542 of the handle 50 are completely received in the hook slots 42 of the base 40, the movable member 80 will be forced by the rebound force generated by the second elastic member 90 to move back to the first position, such that the second retaining portion 82 of the movable member 80 can be engaged with the first retaining portion 56 of the handle 50, as shown in FIGS. 3 and 4, to make sure that the handle 50 can be firmly engaged with the base 40.

Accordingly, by means of the pivotal movement of the handle, the first protrusions or the second protrusions of the handle can be stopped against the periphery walls of the insertions or the stopping portions of the computer case for providing an inward force to push the hard disk case deep into the computer case and to push the hard disk drive into electrical and mechanical engagement with the connector of the computer case, or for providing an outward force to pull the hard disk case away from the computer case and to pull the hard disk drive to be separated from the connector of the computer case. In other word, the hard disk case of the present invention can be expeditiously and smoothly assembled with or disassembled from the computer case, thereby enhancing convenience of its assembly and disassembly works.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hard disk case for installation in a computer case having an insertion portion and a stopping portion adjacent to the insertion portion, the hard disk case comprising:
   a support frame for installation of a hard disk drive;
   a base mounted to the support frame; and
   a handle having a pivoting end pivotally connected with the base, a first protrusion insertable in the insertion portion of the computer case and pushable against a periphery wall of the insertion portion of the computer case for enabling engagement of the hard disk drive with the computer case, and a second protrusion spaced from the first protrusion and pushable against the stopping portion of the computer case for enabling disengagement of the hard disk drive from the computer case.

2. The hard disk case as claimed in claim 1, wherein the base has two hook slots and the handle has a connecting end opposite to the pivoting end with two hook portions respectively engageable with the hook slots of the base.

3. The hard disk case as claimed in claim 2, further comprising a button mounted with the handle and a movable member movably mounted to the base and connected to the button such that the movable member can be driven by the button to move relative to the base between a first position where a first retaining portion of the handle is engageable with a second retaining portion of the movable member and a second position where the first retaining portion of the handle is disengageable from the second retaining portion of the movable member.

4. The hard disk case as claimed in claim 3, wherein the first retaining portion of the handle has a first inclined surface and the second retaining portion of the movable member has a second inclined surface with an inclined direction equal to that of the first inclined surface.

5. The hard disk case as claimed in claim 3, wherein the button has an extending portion and the movable member has a notch for insertion of the extending portion of the button.

6. The hard disk case as claimed in claim 3, further comprising an elastic member with two ends thereof respectively stopped against the movable member and the base for providing a rebound force for moving the movable member from the second position to the first position.

7. The hard disk case as claimed in claim 1, further comprising an elastic member disposed in the base and stopped against the handle for providing an elastic force to move the handle away from the base.

* * * * *